United States Patent
Keskiväli et al.

(10) Patent No.: US 12,122,971 B2
(45) Date of Patent: Oct. 22, 2024

(54) OCTANE ENHANCED INTERMEDIATE HYDROCARBON COMPOSITION

(71) Applicant: Neste Oyj, Espoo (FI)

(72) Inventors: Juha Keskiväli, Porvoo (FI); Anna Karvo, Porvoo (FI); Ulla Kiiski, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 18/043,180

(22) PCT Filed: Aug. 26, 2021

(86) PCT No.: PCT/FI2021/050573
§ 371 (c)(1),
(2) Date: Feb. 27, 2023

(87) PCT Pub. No.: WO2022/043611
PCT Pub. Date: Mar. 3, 2022

(65) Prior Publication Data
US 2023/0227745 A1    Jul. 20, 2023

(30) Foreign Application Priority Data
Aug. 31, 2020 (FI) .................... 20205840

(51) Int. Cl.
C10L 10/10 (2006.01)
C10L 1/06 (2006.01)

(52) U.S. Cl.
CPC ............... *C10L 10/10* (2013.01); *C10L 1/06* (2013.01); *C10L 2200/0423* (2013.01); *C10L 2200/0469* (2013.01); *C10L 2270/023* (2013.01)

(58) Field of Classification Search
CPC .... C10L 10/10; C10L 1/06; C10L 2200/0423; C10L 2200/0469; C10L 2270/023
See application file for complete search history.

(56) References Cited

U.S. PATENT DOCUMENTS 2,263,266 A   11/1941 Forney
4,244,704 A   1/1981 Sweeney et al.
(Continued)

FOREIGN PATENT DOCUMENTS

CN   103562353 A   2/2014
CN   105102588 A   11/2015
(Continued)

OTHER PUBLICATIONS

Boot et al., "Impact of fuel molecular structure on auto-ignition behavior—Design rules for future high performance gasolines", Progress in Energy and Combustion Science, Science 60 (2017) 1-25.
(Continued)

*Primary Examiner* — Latosha Hines
(74) *Attorney, Agent, or Firm* — Buchanan Ingersoll & Rooney, PC

(57) ABSTRACT

A novel octane enhanced intermediate hydrocarbon composition having a high bio-component content in the composition through the use of a renewable first gasoline component is herein disclosed. The intermediate hydrocarbon composition includes a renewable first gasoline component in an amount of from 5 to 50%-vol of the total intermediate hydrocarbon composition volume and the rest consisting of a second gasoline component, wherein the second hydrocarbon gasoline component includes unsaturated hydrocarbons from 50 to 90%-vol of the second gasoline component volume.

21 Claims, 4 Drawing Sheets

(56) References Cited

U.S. PATENT DOCUMENTS

| | | | |
|---|---|---|---|
| 4,812,146 | A | 3/1989 | Jessup |
| 9,169,444 | B2 | 10/2015 | Gosselink et al. |
| 9,885,000 | B2 | 2/2018 | Nousiainen et al. |
| 10,450,521 | B2 | 10/2019 | Nousiainen et al. |
| 2005/0279018 | A1 | 12/2005 | Cracknell |
| 2011/0319683 | A1* | 12/2011 | Abhari ............... C10G 3/46 585/16 |
| 2012/0266838 | A1 | 10/2012 | Gosselink et al. |
| 2015/0144087 | A1* | 5/2015 | Rantanen-Kolehmainen ............. C10G 3/52 44/449 |
| 2016/0032204 | A1 | 2/2016 | Nousiainen et al. |
| 2018/0044601 | A1 | 2/2018 | Nousiainen et al. |
| 2018/0230391 | A1 | 8/2018 | Price et al. |
| 2018/0355265 | A1 | 12/2018 | Price et al. |
| 2019/0233751 | A1 | 8/2019 | Medoff |
| 2020/0048569 | A1 | 2/2020 | Karvo et al. |

FOREIGN PATENT DOCUMENTS

| | | | |
|---|---|---|---|
| EP | 1741768 | A1 | 1/2007 |
| EP | 2155838 | B1 | 9/2014 |
| FI | 100248 | B | 10/1997 |
| WO | WO 01053436 | A1 * | 7/2001 |
| WO | 2007068795 | A1 | 6/2007 |
| WO | 2016016336 | A1 | 2/2016 |
| WO | 2016062868 | A1 | 4/2016 |
| WO | 2016075166 | A1 | 5/2016 |
| WO | WO-2018069137 | A1 * | 4/2018 ............... C07C 9/16 |
| WO | 2018215881 | A1 | 11/2018 |
| WO | 2019034582 | A1 | 2/2019 |
| WO | 2019084518 | A1 | 5/2019 |

OTHER PUBLICATIONS

Demirbas et al., "Octane Rating of Gasoline and Octane Booster Additives", Petroleum Science and Technology, 33:1190-1197, 2015.
Finnish Search Report dated Dec. 11, 2020, issued by the European Patent Office in corresponding Finnish Application No. 20205840 (2 pages).
International Preliminary Report on Patentability (PCT/IPEA/409) issued on Sep. 29, 2022, by the European Patent Office as the International Searching Authority for International Application No. PCT/FI2021/050573. (15 pages).
International Search Report (PCT/ISA/210) and Written Opinion (PCT/ISA/237) mailed on Oct. 28, 2021, by the European Patent Office as the International Searching Authority for International Application No. PCT/FI2021/050573. (13 pages).
First Office Action issued on Aug. 19, 2023, by the Chinese Patent Office in corresponding Chinese Patent Application No. 202180052864. 6, and an English Translation of the Office Action. (30 pages).

* cited by examiner

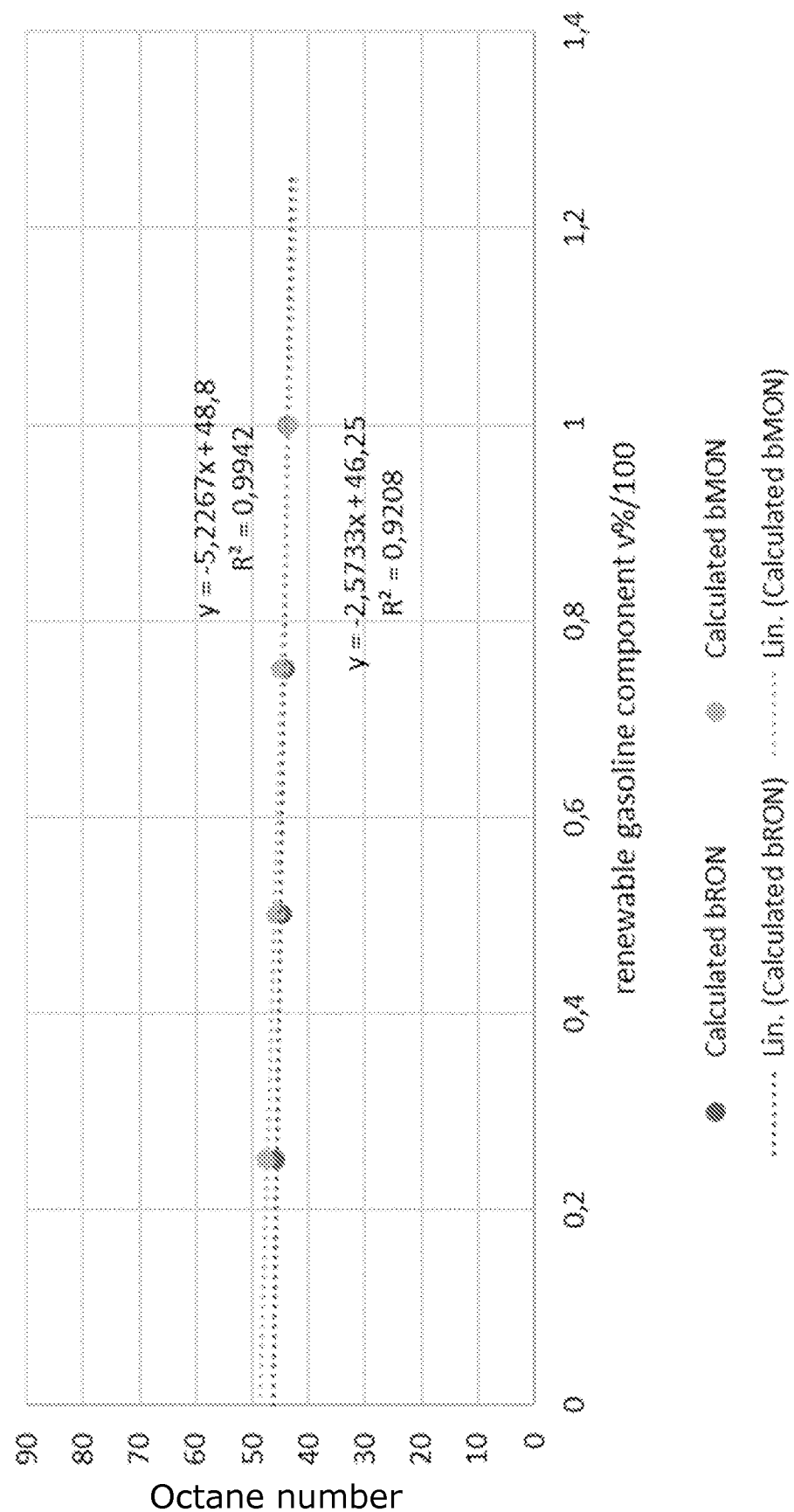

OCTANE ENHANCED INTERMEDIATE HYDROCARBON COMPOSITION

TECHNICAL FIELD

The present disclosure generally relates to gasoline fuel compositions comprising a renewable first gasoline component, intermediates and uses thereof. The disclosure relates particularly, though not exclusively, to blends of two hydrocarbon components providing improved octane numbers to intermediates thereof.

BACKGROUND

Commercial gasoline, which is fuel for internal combustion engines, is a refined petroleum product that is typically a mixture of hydrocarbons (base gasoline) and additives. Additives are added to the base gasoline to enhance the performance and the stability of gasoline. Said additives comprise for example antioxidants and octane enhancers.

When used in high compression internal combustion engines, gasoline has the tendency to "knock". Knocking occurs when combustion of the air/fuel mixture in the cylinder does not start off correctly in response to ignition because one or more pockets of air/fuel mixture pre-ignite outside the envelope of the normal combustion front. Anti-knocking agents, also known as octane enhancers, reduce the engine knocking phenomenon, and increase the octane rating of the gasoline. Traditional octane enhancers such as tetraethyl lead and methylcyclopentadienyl manganese tricarbonyl (MMT) have been or are being banned in many countries for environmental and health reasons.

The anti-knock quality of a fuel is normally rated by its octane number (ON), which can be determined in accordance with one of two protocols on a so-called cooperative fuel research (CFR) engine: Research Octane Number (RON) or Motor Octane Number (MON). Both standards use n-heptane and iso-octane as reference fuels. To date, both values are determined on a standardized CFR engine in accordance with ASTM protocols D-2699 and D-2700, respectively. Both norms were designed to be representative of the mildest (RON) and most severe (MON) operating conditions. In both tests, the highly reactive n-heptane and highly stable iso-octane are used as surrogate fuels, spanning the octane scale from 0 to 100, respectively.

The modern gasoline specifications typically require RON to be at least 95 and MON 85. Literature provides typically different octane boosting agents to raise the octane numbers to desired level.

Boot et al. studied in Progress in Energy and Combustion Science, 2017; 60: 1-25, organic octane enhancers attempting to understand the underlying chemistry and offer design rules for good anti-knock performance. Their academic approach provided many angles to factors around the subject from engine technology development via octane rating methods, to organic radicals, functionalities, reaction pathways and reactivities. As a conclusion they proposed a general formula for an organic (i.e. non-metallic) octane enhancer compound. They accepted the base gasoline, (or "raw" gasoline) exhibiting inadequate anti-knock qualities and focused on prediction of best octane enhancers instead. However, they did not propose improvement to the composition of the "raw" gasoline, the predominant component of the gasoline, as such.

A patent application WO2019034582A1 provides a method producing gasoline fuels by blending two or more refinery streams and optionally one or more fuel additives. Said method further comprises testing the octane number for said blend and comparing it with the target and if needed, adding an octane-boosting additive having a specific aromatic structure. Said method is nevertheless not concerned with the bio-component content of the gasoline fuel obtainable.

By definition, blending (by volume) linearly primary reference fuels of n-heptane and iso-octane determine the octane number of the mixture. However, quantifying the octane number of mixtures comprising additional components (e.g., other hydrocarbons, oxygenates, etc.) is challenging because blending interactions are highly non-linear. As generally understood in the field, many of the important specification parameters such as octane and vapor pressure do not blend linearly rendering predicting octane number for multi-component compositions demanding. Governments and other authorities require biofuels to achieve an increasing share of transport energy in future.

Gasoline components derived from raw materials of biological origin are desirable but typically suffer from drawbacks leading to limitations as to the bio-component content. Ethanol obtained from e.g. fermentation is an attractive bio-component for its octane boosting properties. The ethanol content in gasoline is nevertheless limited mainly due to maximum oxygen content accepted in gasoline blends.

Further, paraffinic gasoline components derived from raw materials of biological origin provide excellent combustion properties, but have been associated with poor octane values.

A prior art publication WO2016075166A1, introduces naphtha, e.g. petroleum-derived naphtha or Fischer-Tropsch derived naphtha, as a gasoline component. Naphtha is defined as a mixture of hydrocarbons generally having between 5 and 12 carbon atoms and having a boiling point in the range of 30 to 200° C. However, as expected by the skilled person the Fischer-Tropsch derived naphtha reported therein, has a very low anti-knock index, commonly at most 40.

There remains a need for gasoline blends wherein renewable gasoline component is used, said blends showing satisfactory anti-knock properties. Further, there is a need for gasoline blends, wherein a notable part of the hydrocarbons originates from raw materials of biological origin and thus can be rated as renewable paraffinic hydrocarbons with the end product properties meeting the industry standards. There is yet a further need to provide gasoline blends, wherein the hydrocarbon components originate from both renewable and fossil sources and wherein the use of octane boosting agents is minimized or avoided altogether.

SUMMARY

It is an aim of the present disclosure to eliminate at least some of the problems relating to the known technology and to provide a new intermediate hydrocarbon composition having a high bio-component content in the composition through use of a renewable first gasoline component.

It is a further aim of the present disclosure to provide a novel intermediate hydrocarbon composition, which is at least partially based on hydrocarbons derived from renewable sources to provide gasolines meeting high-level anti-knock requirements.

There is another aim to provide blends wherein renewable first gasoline component may be used as a gasoline component despite its intrinsically modest octane number characteristics.

Further, it is an aim to increase the bio-component content in traffic fuels at the same time providing gasoline compatible with, and securing high performance to modern cars.

According to a first aspect of the present disclosure here is provided an intermediate hydrocarbon composition consisting of two components according to claim 1.

According to a second aspect of the present disclosure herein is provided, according to claim 11, a use of a gasoline component for increasing RON of another gasoline component to provide an intermediate hydrocarbon composition as defined in the first aspect.

According to a further aspect, here is disclosed further uses, wherein said intermediate hydrocarbon composition is blended with at least one further component to provide a gasoline fuel. Said gasoline fuel may be defined as fulfilling requirements set in Directive 2009/30/EC and optionally EN228:2012 amended 2017. Particularly, the RON of said gasoline fuel as measured according to ASTM D2699, is high, from 90 RON to 110 RON.

Different non-binding example aspects and embodiments have been illustrated in the foregoing. The embodiments are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIGS. 3 and 4 show comparative examples wherein octane numbers were determined for two-component blends with different paraffinic components, wherein blend octane values were not improved.

DETAILED DESCRIPTION

Figure 1:
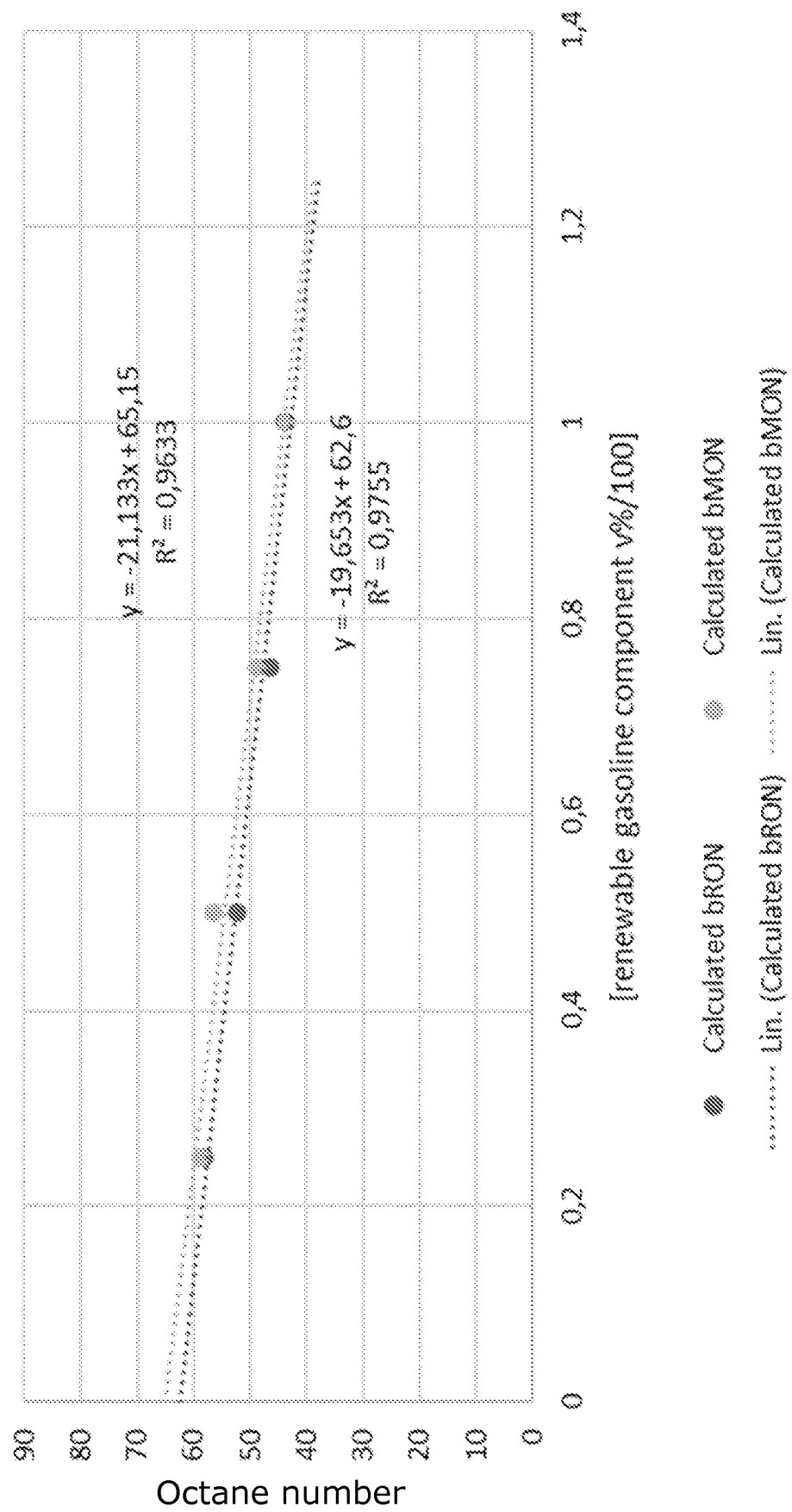
FIGS. 1 and 2 show results wherein octane numbers were determined for two-component blends proving better blend octane (bRON and bMON) values for renewable first gasoline component than expected.

As the first aspect, here is provided an intermediate hydrocarbon composition comprising:
  a renewable first gasoline component in an amount of from 5 to 50%-vol, of the total intermediate hydrocarbon composition volume;
  and the rest of the total intermediate hydrocarbon composition volume consisting of a second gasoline component, wherein said second gasoline component comprises unsaturated hydrocarbons from 50 to 90%-vol of the second gasoline component volume.

Said two-component blend provided unexpected results experimentally with regard to octane numbers. Said renewable first gasoline component showed considerably improved blend octane values when blended with components rich in unsaturated hydrocarbons. Surprisingly, the RON of said intermediate hydrocarbon composition as measured according to ASTM D2699, can vary from 70 to 95, preferably from 75 to 95. The present experiments revealed how the bRON of the renewable first gasoline component was unexpectedly high when blended with a second gasoline component rich in unsaturated hydrocarbons.

Based on experiments conducted, an intermediate hydrocarbon composition comprising said first and second gasoline components within the ranges mentioned, measured good octane number, at the same time providing characteristics desired for end product gasoline fuels and a notable bio-component content. These advantages are even more clear when the amount of renewable first gasoline component is from 20 to 50%-vol of the total intermediate hydrocarbon composition volume.

As used herein, "bio-component content" refers to the share of component of biological origin or a component derived from renewable sources in the intermediate hydrocarbon composition. In general, as used here, "renewable" refers to objects of bio-origin or derived from wastes. The bio-component content in a gasoline fuel as an end product, is also of interest, especially for regulatory reasons.

As used herein, "fossil" or "derived from petroleum" refer to non-renewable fuels and non-renewable energy in contrast to renewable counterparts. Said renewable and fossil components are considered differing from one another based on their origin and impact on environmental issues. Therefore, they are treated differently under legislation and regulatory framework.

Typically, renewable and fossil components are differentiated based on their origin and information provided by the producer. However, chemically the renewable or petroleum origin of any hydrocarbons can be determined by isotopic distribution involving $^{14}C$, $^{13}C$ and/or $^{12}C$ as described in ASTM D6866.

With gasoline, it is here referred to a liquid fuel having a boiling point in the range of 30 to 200° C. and comprising hydrocarbons having from 4 to 12 carbon atoms. In the art, there have been attempts to differentiate between "raw" gasoline having inferior properties, such as anti-knock properties from fuel grades having excellent properties and fulfilling requirements set to high octane fuels. As used herein, "gasoline fuel" refers to an end-product meeting specifications, such as EN 228:2012 Amended 2017

A gasoline component refers to a stream useful as a blend component which together with other streams contributes to a gasoline fuel end product meeting specifications.

As used herein, intermediate hydrocarbon composition refers to a two-component blend of a renewable first gasoline component and a second gasoline component as defined in this specification. Its character as an intermediate refers to its use as a base gasoline, which eventually is blended with at least one further component to provide a gasoline fuel fulfilling requirements set by authorities for traffic gasoline or petrol grades. Both the renewable first gasoline component and the second gasoline component of the intermediate hydrocarbon composition consist essentially of hydrocarbons.

Such an intermediate hydrocarbon composition provides significant further advantages. Since said intermediate hydrocarbon composition comprises no oxygenates, it provides a base gasoline useful for various different end products. For markets which do not allow the use of oxygenates, it can be further adjusted with components or additives meeting set requirements. On the other hand, should oxygenates be allowed, such an additive, e.g. an octane enhancer comprising oxygen may further be blended with said intermediate hydrocarbon composition either in a refinery or at a distribution terminal. An example of such procedure may be a use of the intermediate hydrocarbon composition, which is blended with ethanol only at a distribution terminal.

Here, it is especially notable that a gasoline fuel comprising an intermediate hydrocarbon composition according to the present disclosure, always provides advantageous gasoline compositions with regard to environmental aspects and requirements since it comprises renewable hydrocarbons at least 5%-vol, preferably at least 20%-vol and up to 50%-vol, and according to some embodiments, further renewable components, such as renewable oxygenates.

As used herein, the first gasoline component refers to a renewable gasoline component. By definition, said renewable first gasoline component is derived from renewable sources, such as biological fat or oils by hydroprocessing or by Fischer-Tropsch reaction from renewable synthesis gas.

Said renewable first gasoline component comprises alkanes, which are also referred to as paraffins, more specifically it contains n-alkanes, iso-alkanes and cyclo-alkanes. Typically, content of any other types of hydrocarbons or oxygenates in said renewable first gasoline component is negligible, such as below 0.5%-vol of the renewable first gasoline component volume.

In said renewable first gasoline component, the sum amount of the renewable C4-C9 n-alkanes, renewable C4-C11 iso-alkanes and renewable C4-C9 cyclo-alkanes varies from 92 to 100%-vol, preferably from 96 to 100%-vol and more preferably from 99 to 100%-vol of the total renewable first gasoline component volume. Typically, the amount of components other than the alkanes defined above is less than 8%-vol, preferably less than 4%-vol. Typical components therein comprise less than 0.5%-vol alkenes, less than 0.5%-vol 010-C13 n-alkanes, less than 0.5%-vol C11-C14 iso-alkanes, less than 0.5%-vol C10-C13 cyclo-alkanes. The renewable first gasoline component may be very low in aromatic contents, i.e. contain a low amount of aromatic compounds such as e.g. benzene and/or toluene and derivatives thereof. Thus, the aromatic content of the renewable first gasoline component may be e.g. about 0.1%-vol, preferably less than 0.1%-vol or even aromate-free.

The renewable first gasoline component may comprise essentially a mixture of C4-C9 hydrocarbons (i.e. hydrocarbons having 4 to 9 carbon atoms), such as a mixture of C4-C9 n-alkanes, iso-alkanes and cyclo-alkanes. Due to the character of this component consisting essentially of alkanes (n, iso, cyclo) or paraffins (n, iso, cyclo), it could also be referred to as a "renewable paraffinic gasoline component". The renewable first gasoline component may consist of a mixture of C4 to C9 hydrocarbons ($CnH_{2n+2}$, n=4, 5, 6, 7, 8 or 9), i.e. straight-chained or branched hydrocarbons having 4 to 9 carbon atoms originating from renewable sources such as e.g. plant, animal or waste oils and fats, and consequently not derived from any fossil based material.

Characterizing a hydrocarbon composition by hydrocarbon type [paraffinic (alkanes), naphthenic (cyclo-alkanes), olefinic (alkenes) and aromatic] and carbon number, they may be measured according to ENIS022854 or by other gas chromatography-based detailed hydrocarbon analysis. Using the analysis results, the hydrocarbon composition of the blends was calculated by accounting the blending volumetric ratios.

The renewable first gasoline component has at least some of the following characteristics: melting point<−60° C. (EEC A1/A2), initial boiling point and boiling range>40-170° C. (EN ISO 3405), flash point<0° C. (EEC A9). As further characteristics to a typical sample of the renewable first gasoline component vapor pressure 18.5 kPa at 20° C. (EEC A4) and auto-ignition temperature~255° C. (EC A15) may be mentioned.

The amount of said renewable first gasoline component is advantageously from 5 to 50%-vol, preferably from 20 to 50%-vol of the total intermediate hydrocarbon composition volume. Such amount provides a desired bio-component content to a final product when said intermediate is blended with further gasoline component(s).

It has been previously assessed that blending renewable first gasoline component to gasoline blends sets challenges because of its implicitly low octane numbers. However, it has now been shown how blending of a renewable first gasoline component with a second gasoline component rich in unsaturated compounds, thus olefins, aromatics or combinations thereof, surprisingly improves anti-knock properties of renewable first gasoline component, even in amounts as high as 50%-vol of the total intermediate hydrocarbon composition volume.

According to a preferred embodiment, the component is derived from renewable sources, such as fatty acids or esters thereof, by hydroprocessing or by Fischer-Tropsch conversion of syngas obtained by gasification of biomaterial. Processes for converting renewable raw materials into renewable paraffins by hydroprocessing are known in the art, and disclosed for example in FI100248B, EP1741768A1, WO2007068795A1, or EP2155838B1. The product therefrom may be further processed and fractionated to provide a renewable first gasoline component, typically the further fractions comprising at least one of renewable paraffinic diesel, renewable paraffinic aviation fuels, and possibly heavier, such as renewable paraffinic base oil or renewable paraffinic transformer oil.

As used herein, hydroprocessing refers to hydrodeoxygenation, hydrodesulfurization, hydrodenitrogenation, hydrodehalogenation (such as hydrodechlorination), hydrogenation of double bonds, hydrocracking, hydroisomerization and it also removes some metals. Hydroprocessing is needed for removal of covalently bound oxygen from the fatty acid and eventual fatty acid esters, such as reminder glyceride molecules. Typically, this means deoxygenation by hydrogenation i.e. hydrodeoxygenation (HDO) and hydrogenation of double bonds, followed by hydroisomerization.

The hydrodeoxygenation may take place at reaction conditions comprising a temperature in the range from 100 to 500° C., preferably from 250 to 400° C., more preferably from 280-350° C., most preferably at temperature of 300-330° C.; and at a pressure in the range from 0.1 to 20 MPa, preferably from 0.2 to 8 MPa. Preferably, the weight hourly space velocity (WHSV) is in the range from 0.5 to 3.0 $h^{-1}$, more preferably from 1.0 to 2.5 $h^{-1}$, most preferably from 1.0 to 2.0 $h^{-1}$. Preferably, $H_2$ flow is in the range from 350 to 900 nl $H_2$/I feed, more preferably from 350 to 750, most preferably from 350 to 500, wherein nl $H_2$/I means normal liters of hydrogen per liter of the feed into the HDO reactor, in the presence of a hydrodeoxygenation catalyst. The hydrodeoxygenation catalyst is preferably selected from Pd, Pt, Ni, Co, Mo, Ru, Rh, W, or any combination of these, such as CoMo, NiMo, NiW, CoNiMo on a support, wherein the support is preferably alumina and/or silica.

Hydroprocessing may comprise hydrodeoxygenation and hydroisomerization, simultaneously or in sequence. When conducted in sequence, hydroprocessing comprises first hydrodeoxygenation and then hydroisomerization.

Hydroisomerization can be carried out in a conventional hydroisomerization unit. Hydrogen is added into the hydroisomerization step. Both the hydrodeoxygenation step and hydroisomerization step may be conducted in the same reactor, and even in the same reactor bed. The hydroisomerization catalyst may be a noble metal bifunctional catalyst such as a Pt containing commercial catalyst, for example Pt-SAPO or Pt-ZSM-catalyst or for example a non-noble catalyst, such as NiW. The hydrodeoxygenation and hydroisomerization steps may be performed in the same catalyst bed using e.g. the NiW catalyst in both the hydrodeoxygenation and isomerization.

The isomerization step is preferably performed at a temperature from 250 to 400° C., more preferably from 280 to 370° C., most preferably from 300 to 350° C. Pressure is preferably from 1 to 6 MPa, more preferably from 2 to 5 MPa, most preferably from 2.5 to 4.5 MPa. The WHSV is preferably from 0.5 to 3 $h^{-1}$, more preferably from 0.5 to 2 $h^{-1}$, most preferably from 0.5 to 1 $h^{-1}$, and $H_2$ flow is in-liter $H_2$/liter feed, preferably from 100 to 800, more preferably from 200 to 650, most preferably from 350 to 500.

The isomerization treatment is a step which predominantly serves to isomerize the hydrodeoxygenated raw material. That is, while most thermal or catalytic conversions (such as HDO) result in a minor degree of isomerization (usually less than 5 wt-%), the isomerization step leads to a significant increase in the content of isoparaffins.

During the conventional hydroisomerization some cracking may be present. Therefore, the selection of the catalyst and optimization of reaction conditions are always important during the isomerization step. Due to cracking during isomerization, renewable diesel and renewable first gasoline components are formed. The renewable first gasoline component thus obtained has typically inadequate octane numbers, and is a challenging component unless blended with a second gasoline component to form an intermediate hydrocarbon composition.

As used in the present disclosure, the second gasoline component refers to a gasoline blend component rich in unsaturated hydrocarbons and derived from a common crude oil refining process, such as FCC or reformation. The second gasoline component according to the present disclosure comprises unsaturated hydrocarbons from 50 to 90 vol-%, preferably from 60 to 90%-vol, more preferably from 65 to 85%-vol of the total second gasoline component volume. Again, as the present disclosure concerns gasoline, the second gasoline component is a fraction obtained by distillation and can be defined by its distillation end points.

Even though gasoline is most typically defined by its initial and final boiling points, some examples of said second gasoline component were analyzed, and the unsaturated hydrocarbons therein were found to consist of C6-C12 aromatic hydrocarbons, C4-C10 olefinic hydrocarbons or a combination thereof.

The experiments conducted revealed also that an intermediate hydrocarbon composition according to present disclosure provides best blend octane results when the total amount of C7-C11 hydrocarbons is at least 59%-vol, preferably at least 65 vol-%, most preferably at least 70%-vol of the total intermediate hydrocarbon composition volume. This carbon number range was connected to the desired share of unsaturated hydrocarbons in the intermediate hydrocarbon composition.

When the predominant part of the second gasoline component volume consists of unsaturated hydrocarbons, that is olefins and aromates, the rest of the second gasoline component volume consists essentially of saturated hydrocarbons, hence paraffins. Again, depending on distillation conditions, the saturated hydrocarbons in said second gasoline component comprise C4-C12 alkanes (n or iso-alkanes), C5-C10 cyclo-alkanes or combinations thereof.

The second gasoline component is best characterized by its unsaturated hydrocarbon content. Typically said second gasoline component is derived from petroleum, for example by conventional refinery processes such as fluid catalytic cracking (FCC) or reforming. Such components originate from fossil sources and represent conventional streams within petrochemistry and oil refining, see e.g. Automotive Fuels Reference Book, Third Edition R-297, ISBN 978-0-7680-0638-4 Chapter 3, Manufacture of Gasoline and Diesel Fuel from Crude Oil, pages 31-60. Using a second component common to the traditional petroleum refining contributes to the compatibility of a gasoline fuel comprising the present intermediate hydrocarbon composition with gasoline driven engines. Further, advantages may be gained through product demand pattern on processing, when well-known fractions find further uses. However, some renewable sources from fields other than petroleum refining, such as kraft pulping side streams rich in aromatics and refined by hydrotreatment, could be considered as second gasoline component provided that it is rich in unsaturated hydrocarbons.

The unsaturated hydrocarbons in a preferred embodiment of the present intermediate hydrocarbon composition comprises of a combination of C6-C12 aromatic hydrocarbons and C4-C10 olefinic hydrocarbons, wherein the ratio by volume of aromatic hydrocarbons to olefinic hydrocarbons is from 0.01 to 1, preferably from 0.5 to 0.9. In experimental results, the octane improving effect was found to be stronger with olefins than aromatics and hence, in experimental part such a second gasoline component is referred to as "olefinic component". Typically, a second gasoline component having such characteristics originates from FCC process. When the content of the aromatic hydrocarbons is low, it is easier to meet requirements set to the end products. In case the ratio by volume of aromatic hydrocarbons to olefinic hydrocarbons is from 0.5 to 0.9, such a second component provides further advantages through balanced composition.

Hence, a particular example of the second gasoline component composition can be outlined comprising from 25 to 45%-vol of aromatic hydrocarbons, olefinic hydrocarbons and paraffinic hydrocarbons each. Such a second gasoline component may be a product of catalytic cracking, such as FCC-process, well-known in the art. Due to high olefinic content this second gasoline component may be referred to as an "olefinic component".

Another particular example of the second gasoline component composition can be outlined comprising more than 80%-vol aromatic hydrocarbons, less than 5%-vol olefins and the rest paraffinic hydrocarbons. Such component can be referred to as an "aromatic component" and it is obtainable by a catalytic reformation process known in the art.

It is understood, that when preparing an end product, such as high octane gasoline, a blend is prepared wherein the intermediate hydrocarbon composition according to the present disclosure forms part of the end product together with further components, such as octane enhancers.

With octane enhancers is herein referred to octane improvers such as oxygenates (e.g. ethers and alcohols) and aromatic amines. Preferably octane enhancers are not based on metals. They are typically used as minor components in relation to the total volume of the end product. The nature of octane enhancers as additives can be understood by the proportions of the components. For example, N-methyl aniline (NMA), an aromatic amine, is used at a relatively high proportion (1.5 to 2% volume additive/volume end product) for desired effect on octane number of the end product. Oxygenates may be used at even higher proportions, from 3% up to the maximum oxygen and/or oxygenate content permitted by the relevant fuel specification. When used together with the intermediate hydrocarbon composition of the present disclosure, the amount of an octane enhancer is typically from 0.5 to 10%-vol of the gasoline fuel volume as the end product volume.

Blending the renewable first gasoline component and the second gasoline component together by volume, to form the intermediate hydrocarbon composition of the present disclosure, lies within basic skills in the field. A man skilled in the art has different options for blending the intermediate hydrocarbon composition with further components to obtain desired grade end products. Typically, the order of addition of different components is not crucial for the end product. According to one obvious variety, the renewable first gasoline component and the second gasoline component are first combined together to form the intermediate hydrocarbon composition of the present disclosure, and then further components added thereto. However, it is understood that the intermediate hydrocarbon composition as defined here contributes to the properties of said end products even if the order of addition varies, hence if the renewable first gasoline component is initially blended, e.g. with an octane enhancer, and the second gasoline component added thereto or vice versa. According to another example, to the intermediate hydrocarbon composition prepared in a refinery, ethanol may be blended at a distribution terminal, whereby hydroscopic nature of ethanol can better be taken into account.

As a second aspect, here is provided a use of a second gasoline component for increasing RON of a renewable first gasoline component to provide an intermediate hydrocarbon composition. Said second gasoline component and said renewable first gasoline component have the same meanings and advantaged embodiments as defined in relation to said intermediate hydrocarbon composition above.

The intermediate hydrocarbon composition of the present disclosure can make as high as 80%-vol, preferably 90%-vol or more preferably as high as 98%-vol of the total gasoline fuel volume. Hence, it can be stated that the intermediate hydrocarbon composition forms the major part of the end product composition, or that the intermediate hydrocarbon composition is the predominant constituent of the end product. In other words, said intermediate hydrocarbon composition can be referred to as the base gasoline for gasoline fuels.

According to further embodiments, the gasoline fuel as the end product may further comprise one or more further hydrocarbon component(s) selected from reformate, alkylate, isomerate and naphtha. A man skilled in the art is well aware that in order to meet certain requirements, e.g. butane, i/n-hexane, i/n-pentane, toluene or iso-octane addition may be needed to adjust the gasoline properties.

According to yet another aspect, a gasoline fuel is provided when the intermediate hydrocarbon composition of the present disclosure is blended with at least one further component selected from butane and octane enhancer(s), such as ethers or alcohols.

More specifically, the octane enhancers may be selected from ETBE, MTBE, TAME, TAEE, mixed ethers, ethanol, methanol, i- or n-propanol, i- or n-butanol, tertiary butanol, or mixed C1 to C5 alcohols, or any combination thereof. Blending of further component(s) to said intermediate hydrocarbon composition provides means for adjusting gasoline fuel characteristics to correspond to desired specifications.

As an embodiment, said intermediate hydrocarbon composition together with at least one further component provides a gasoline fuel fulfilling requirements set in e.g. EN 228:2012, Amended 2017. Preferably said further component is selected from octane enhancers. Such gasoline fuel is then compatible with existing motors and at the same time provides a significant part of the energy content therein derived from biological sources, or in other words the bio-component content, contributing to meeting regulations related to use of biofuels in road transport. Advantageously, in cases where the octane enhancer is fully or partly of biological origin, the bio-component content of the gasoline fuel may be even higher.

According to an embodiment, a gasoline fuel comprises the present intermediate hydrocarbon composition in an amount of 60-98%-vol, preferably 80-98%-vol of the total gasoline fuel volume. Such amounts provide high renewable component levels while meeting other requirements, such as RON, set to a gasoline fuel. Preferably the gasoline fuel fulfils requirements set in Directive 2009/30/EC and optionally EN228:2012 amended 2017.

Considering preferred embodiments, the RON of said gasoline fuel as measured according to ASTM D2699 is from 90 to 110, preferably from 95 to 100.

In the experimental part, the blend RON and MON ratings of a renewable first gasoline component were studied, and surprisingly the second component containing at least 50%-vol of unsaturated hydrocarbons (olefins and aromatics) improved the aforementioned properties of renewable first gasoline component in two component blends. The components containing mostly saturated hydrocarbons (n-alkanes, iso-alkanes and cyclo-alkanes) had little impact on the blend octane values of renewable first gasoline component, and hence provide comparative examples here. Additionally, the volumetric ratio of the unsaturated components ("aromatic component" and "olefinic component") and renewable first gasoline component has a big impact on the blend octane values. With the "olefinic component", the renewable first gasoline component blend octane varied from 43.9 RON to 64.1 RON and 43.6 MON to 77.85 MON, the blend octane rating increases with decreasing renewable first gasoline component share in the blend. The corresponding values for the blend with the "aromatic component" are 43.9 RON to 62.6 RON and 43.6 MON to 65.15 MON, the increase of octanes follows a similar trend than the blend with "olefinic component". Whilst the unsaturated components improved the blend octanes of renewable first gasoline component, the "paraffinic components 1 and 2" of the comparative examples, had little impact on the blend octanes of renewable first gasoline component. The isomerate blend gave 43.9-46.25 RON and 43.6-48.8 MON values and the industrial gasoline gave 43.9-47.25 RON and 43.6-46.55 MON. Since the blend octane rating does not correlate with the octane rating of the blending components, it can be concluded that olefins and aromatics have some synergistic effect with renewable first gasoline component in oxygenate free blends. Without being bound to a theory, this effect is stronger with olefins than aromatics as better results are obtained with "olefinic component".

EXPERIMENTAL

The following examples illustrate the aspects of the present invention. The measured RON and MON ratings and calculated hydrocarbon compositions for each given two-component blend of "renewable first gasoline component" with either "olefinic component", "aromatic component" or "paraffinic component 1 (isomerate) or 2 (industrial gasoline)" are tabulated to Tables 1-4. Tables 7-8 present bRON and bMON calculated with formula (1), for the "renewable first gasoline component" in different two-component blends with "olefinic component" and "aromatic component" as the second gasoline component and tables 5-6 the corresponding ratings for reference examples conducted with "paraffinic component 1" and "paraffinic component 2". The hydrocarbon distribution as per carbon numbers of the blends studied are compiled to tables 9-12.

The hydrocarbon blends were prepared by mixing the "renewable first gasoline component" as the first gasoline component, as the second component, either "olefinic component" or "aromatic component" to obtain an intermediate hydrocarbon composition according to the present disclosure. As comparative examples, further blends were prepared by mixing the "renewable first gasoline component" with a paraffinic component, namely "paraffinic component 1 or 2", to obtain reference hydrocarbon compositions. Naming said reference compositions as paraffinic, it is emphasized how the high unsaturated content in the aromatic and olefinic component is considered significant. All blends were prepared in a given volumetric share (first: second component) of either 1:3 (25 vol-%/75 vol-%), 1:1 (50 vol-%/50 vol-%) and 3:1 (75 vol-%/25 vol-%). Of these prepared blends RON and MON were measured according to ASTM D2699-18 and ASTM D2700-19, respectively. The hydrocarbon composition of the individual components was measured. Using the analysis results, the hydrocarbon composition of the blends was calculated by accounting the blending volumetric ratios.

TABLE 1

Hydrocarbon composition, RON and MON of the "renewable first gasoline component" and "paraffinic component 1".

| | Blend ratio of "renewable first gasoline component" to "paraffinic component 1" | | |
|---|---|---|---|
| | 1:3 | 1:1 | 3:1 |
| Paraffins [vol-%] | 86.0 | 88.5 | 90.9 |
| Naphthenes [vol-%] | 13.6 | 11.1 | 8.6 |
| Olefins [vol-%] | 0.1 | 0.2 | 0.3 |
| Aromatics [vol-%] | 0.2 | 0.2 | 0.2 |
| RON | 73.5 | 63.8 | 53.6 |
| MON | 72.3 | 63.7 | 54.1 |

TABLE 2

Hydrocarbon composition, RON and MON of the "renewable first gasoline component" and "paraffinic component 2".

| | Blend ratio of "renewable first gasoline component" to "paraffinic component 2" | | |
|---|---|---|---|
| | 1:3 | 1:1 | 3:1 |
| Paraffins [vol-%] | 80.6 | 84.8 | 89.1 |
| Naphthenes [vol-%] | 17.7 | 13.8 | 9.9 |
| Olefins [vol-%] | 0.3 | 0.3 | 0.4 |
| Aromatics [vol-%] | 1.3 | 0.9 | 0.5 |
| RON | 63.8 | 57.3 | 50.5 |
| MON | 63.8 | 57.6 | 51.0 |

The results obtained from blends of the "renewable first gasoline component" with each "paraffinic component 1" and "paraffinic component 2" were disappointing with regard to the octane values. "Paraffinic component 2" contained a significant amount of isoparaffins, which failed to provide the expected improvement to the octane values. Use of any blend of tables 1 or 2 are not attractive candidates for a gasoline fuel, since the amount for octane boosting additive needed to meet requirements of a standard, such as EN228, would be too high to be economical and to meet other specifications.

TABLE 3

Hydrocarbon composition, RON and MON of the "renewable first gasoline component" and "aromatic component".

| | Blend ratio of "renewable first gasoline component" to "aromatic component" | | |
|---|---|---|---|
| | 1:3 | 1:1 | 3:1 |
| Paraffins [vol-%] | 35.1 | 54.6 | 74.0 |
| Naphthenes [vol-%] | 2.5 | 3.7 | 4.8 |
| Olefins [vol-%] | 2.5 | 1.8 | 1.1 |
| Aromatics [vol-%] | 59.8 | 39.9 | 20.0 |
| RON | 93.4 | 78.8 | 61.2 |
| MON | 84.8 | 75.0 | 60.1 |

The blends compiled in table 3, represent an embodiment of the intermediate hydrocarbon composition according to the present invention exhibiting good RON and MON numbers. When blending the two components in vol-ratio 1:1, RON of 78.8 and MON 75.0 were achieved. Even more attractive in terms of anti-knock properties was an intermediate hydrocarbon composition comprising a blend of "renewable first gasoline component" and "aromatic component" in vol-ratio of 1:3. Such intermediate hydrocarbon composition provides RON of 93.4 and MON 84.8 and at the same time, bio-component content of said composition is as high as 25%-vol. Extrapolating from these results, a blend of "renewable first gasoline component": "aromatic component" in vol-ratio 1:4, 1:5, 1:6, 1:7, 1:8, 1:9, 1:10, 1:11, 1:12, 1:13, 1:14, 1:15, 1:16, 1:17, 1:18 or 1:19 seem attractive providing both good octane number and attractive bio-component content to said composition. However, for some purposes intermediate hydrocarbon composition, wherein the blend ratio (vol) of "renewable first gasoline component" and "aromatic component" is 3:1, might be more appropriate providing aromatic content for the intermediate hydrocarbon composition below 25%-vol.

TABLE 4

Hydrocarbon composition, RON and MON of the "renewable first gasoline component" and "olefinic component".

| | Blend ratio of "renewable first gasoline component" to "olefinic component" | | |
|---|---|---|---|
| | 1:3 | 1:1 | 3:1 |
| Paraffins [vol-%] | 43.0 | 59.8 | 76.6 |
| Naphthenes [vol-%] | 8.8 | 7.9 | 7.0 |
| Olefins [vol-%] | 26.0 | 17.5 | 8.9 |
| Aromatics [vol-%] | 22.1 | 14.8 | 7.4 |
| RON | 84.5 | 73.2 | 59.8 |
| MON | 78.4 | 69.9 | 59.5 |

The blends compiled in table 4, represent an embodiment of the intermediate hydrocarbon composition according to the present invention exhibiting good RON and MON numbers. When blending the two components in vol-ratio 1:1, RON of 73.2 and MON 69.9 were achieved. Even more attractive was intermediate hydrocarbon composition comprising a blend of "renewable first gasoline component" and "olefinic component" in vol-ratio of 1:3. Such intermediate hydrocarbon composition provides RON of 84.5 and MON 78.4, and at the same time, bio-component content of said composition is as high as 25%-vol. Extrapolating from these results, a blend of "renewable first gasoline component" and "olefinic component" in vol-ratio 1:4, 1:5, 1:6, 1:7, 1:8, 1:9, 1:10, 1:11, 1:12, 1:13, 1:14, 1:15, 1:16, 1:17, 1:18 or 1:19 seem attractive providing both good octane number and attractive bio-component content to said composition. Furthermore, the aromatic content stays below 30%-vol for any blend presented with the "olefinic component" meeting some requirements set to gasoline fuels.

Using the measured RON and MON for the abovementioned blends, and each second gasoline component ($2^{nd}$ component) with "renewable first gasoline component", blending RON and MON ratings (denoted as bRON and bMON) were calculated for the two-component blends using the formula 1 (Tables 5-6 comparative examples and Tables 7-8 examples showing the surprising findings). In formula 1, "$2^{nd}$ component" refers to the other blend component and comprised each of "olefinic component", "aromatic component", "paraffinic component 1" and "paraffinic component 2" at a time and x refers to the vol-%/100 of the respective component.

$$bRON \text{ ("Renewable first gasoline component")} = \frac{\text{Measured blend } RON - (x_{2nd\ component} * RON_{2nd\ component})}{x_{\text{"Renewable first gasoline component"}}} \quad (1)$$

Calculating bRON is known in the field and has been published for example in U.S. Pat. No. 4,244,704A.

TABLE 5

Calculated bRON and bMON of the "renewable first gasoline component" in a reference blend with "paraffinic component 1" as the other blend component.

| | Blend ratio of "renewable first gasoline component" to "paraffinic component 1" | | |
|---|---|---|---|
| | 1:3 | 1:1 | 3:1 |
| bRON | 46.8 | 45.2 | 44.0 |
| bMON | 45.3 | 46.1 | 45.0 |

TABLE 6

Calculated bRON and bMON of the "renewable first gasoline component" in a reference blend with "paraffinic component 2" as the other blend component.

| | Blend ratio of "renewable first gasoline component" to "paraffinic component 2" | | |
|---|---|---|---|
| | 1:3 | 1:1 | 3:1 |
| bRON | 45.8 | 44.8 | 44.1 |
| bMON | 47.6 | 46.0 | 44.9 |

As can be seen from these results, the calculated bRON and bMON ratings do not differ significantly from relatively low neat RON and MON (around 45), characteristic to the renewable first gasoline component, also referred to as the first gasoline component herein. It can be concluded that "paraffinic component 1" and "paraffinic component 2" do not provide the advantageous effect in two-component blends and hence, are not considered as components for the present intermediate hydrocarbon composition.

The components consisting of paraffins and naphthenes, isomerate and fossil naphtha, i.e. "paraffinic components 1 and 2", had little impact on the blend octanes of renewable first gasoline component. The isomerate blend gave 43.9-46.25 bRON and 43.6-48.8 bMON values and the industrial gasoline gave 43.9-47.25 bRON and 43.6-46.55 bMON. From these results it can be nevertheless concluded that the blend octane rating does not correlate with the octane rating of the blending components.

TABLE 7

Calculated bRON and bMON of the "renewable first gasoline component" in the two-component blend with "aromatic component" as the second gasoline component.

| | Blend ratio of "renewable first gasoline component" to "aromatic component" | | |
|---|---|---|---|
| | 1:3 | 1:1 | 3:1 |
| bRON | 58.3 | 52.5 | 46.6 |
| bMON | 58.7 | 56.5 | 49.0 |

The full range of blend ratios can be observed from FIG. 1, where the blend octanes calculated to the "renewable first gasoline component" vary from 43.9 RON to 62.6 RON and 43.6 MON to 65.15 MON, when the two-component blend, hence the intermediate hydrocarbon composition comprised different amounts of the "aromatic component".

TABLE 8

Calculated bRON and bMON of the "renewable first gasoline component" in the two-component blend with "olefinic component" as the second gasoline component.

| | Blend ratio of "renewable first gasoline component" to "olefinic component" | | |
|---|---|---|---|
| | 1:3 | 1:1 | 3:1 |
| bRON | 59.3 | 53.5 | 48.8 |
| bMON | 70.3 | 58.7 | 52.3 |

Figure 2:
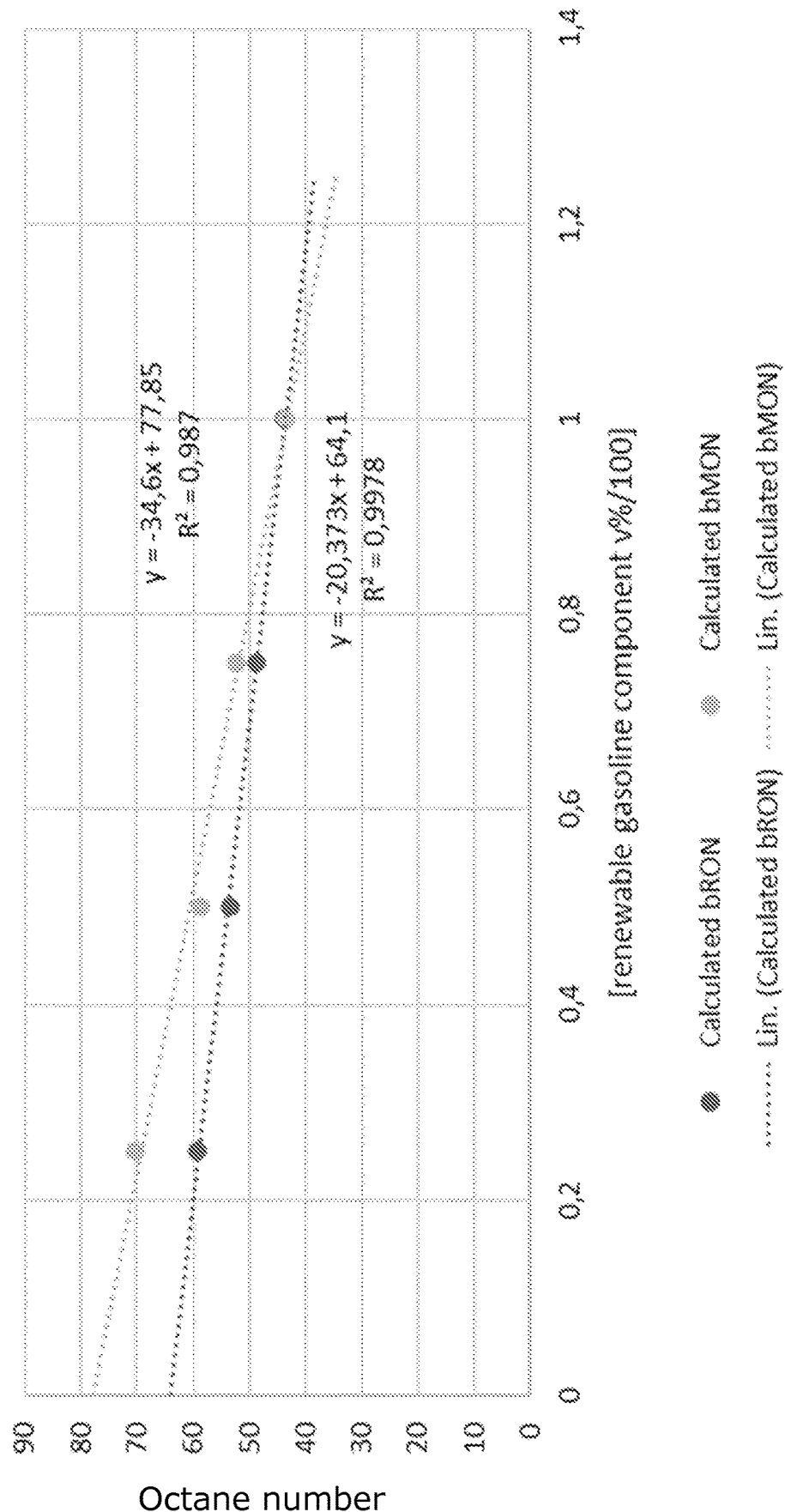
Figure 3:
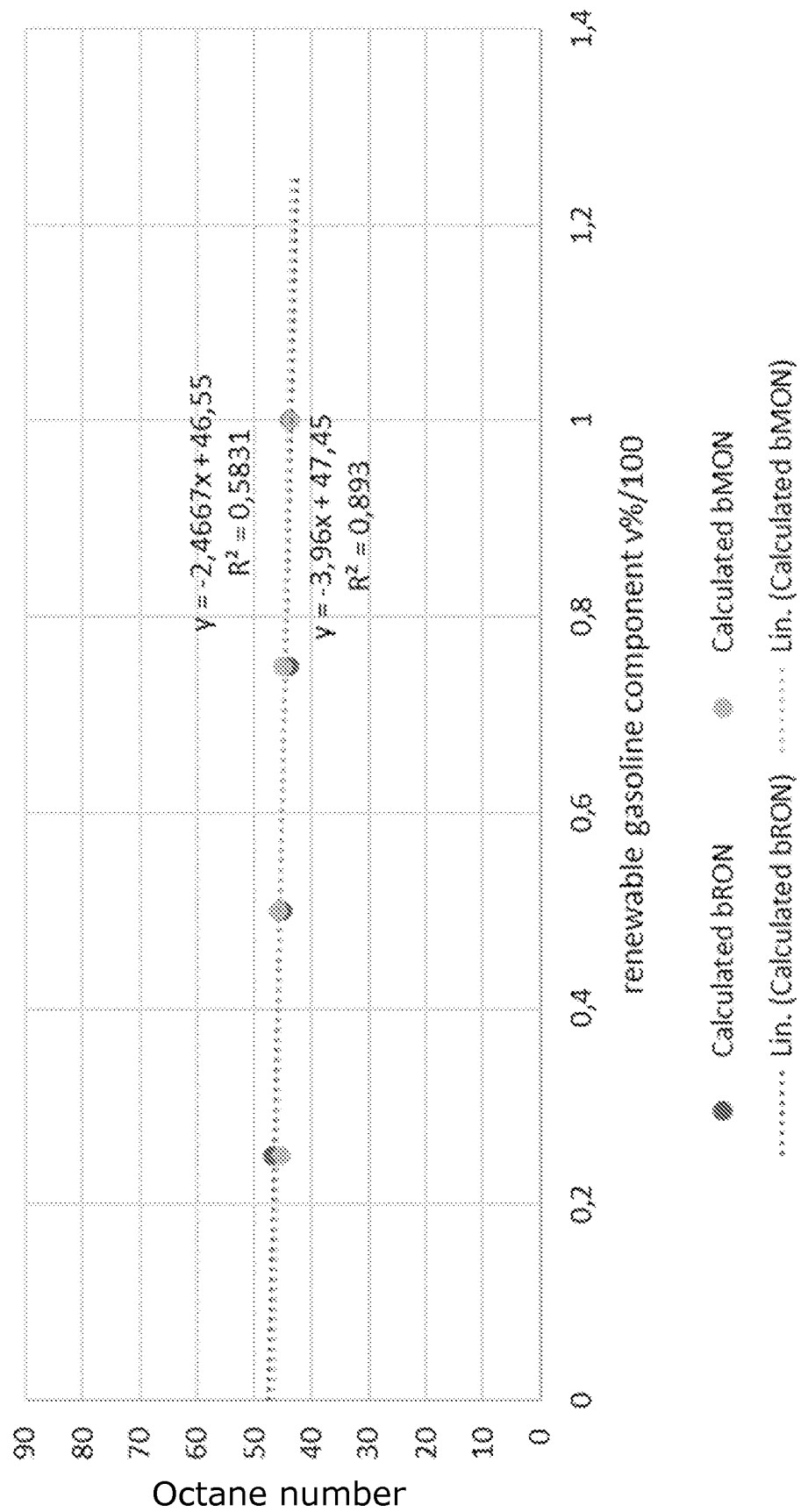

Again, the full range of blend ratios can be observed from FIG. 2, where the blend octanes calculated to the "renewable first gasoline component" vary from 43.9 RON to 64.1 RON and 43.6 MON to 77.85 MON, the blend octane rating increasing with decreasing "renewable first gasoline component" share in the blend with "olefinic component".

From these results it can be seen that the blending of "renewable first gasoline component" with unsaturated components, namely with "olefinic component" and with "aromatic component" enhances the bRON and bMON values.

The detailed hydrocarbon distributions measured from the samples of different reference blends as well as intermediate hydrocarbon compositions according to the present invention are compiled in following tables 9-12. Table 9 provides hydrocarbon distribution as per carbon numbers for blends of "paraffinic component 1" with "renewable first gasoline component" in ratios 3:1, 1:1 and 1:3. Table 10 provides corresponding results measured for "paraffinic component 2". Table 11 provides results according to the present invention, measured for intermediate hydrocarbon compositions, where an "olefinic component" is blended with "renewable first gasoline component" in ratios 3:1, 1:1 and 1:3. Finally, table 12 provides corresponding results measured for a blend with "aromatic component as" the second gasoline component.

TABLE 9

Hydrocarbon distribution as per carbon numbers of blends of "paraffinic component 1" with "renewable first gasoline component" in ratios 3:1, 1:1 and 1:3.

| Carbon number | | 3 | 4 | 5 | 6 | 7 | 8 | 9 | 10 | 11+ | Total |
|---|---|---|---|---|---|---|---|---|---|---|---|
| Paraffins [v %] | 3:1 (v:v) Paraffinic component | 0.0 | 0.2 | 15.8 | 56.5 | 7.6 | 3.9 | 1.2 | 0.5 | 0.3 | 86.1 |
| Olefins[v %] | 1:Renewable gasoline | 0.0 | 0.0 | 0.1 | 0.0 | 0.0 | 0.0 | 0.0 | 0.0 | 0.0 | 0.1 |
| Aromatics [v %] | component | 0.0 | 0.0 | 0.0 | 0.1 | 0.1 | 0.1 | 0.0 | 0.0 | 0.0 | 0.2 |
| Naphthenes [v %] | | 0.0 | 0.0 | 1.6 | 9.1 | 1.6 | 1.1 | 0.3 | 0.1 | 0.0 | 13.6 |
| Total | | 0.0 | 0.2 | 17.5 | 65.6 | 9.3 | 5.0 | 1.5 | 0.6 | 0.3 | 100.0 |
| Paraffins [v %] | 1:1 (v:v) Paraffinic component | 0.0 | 0.2 | 15.6 | 47.0 | 14.1 | 7.6 | 2.4 | 1.0 | 0.6 | 88.5 |
| Olefins[v %] | 1:Renewable gasoline | 0.0 | 0.0 | 0.1 | 0.1 | 0.0 | 0.0 | 0.0 | 0.0 | 0.0 | 0.2 |
| Aromatics [v %] | component | 0.0 | 0.0 | 0.0 | 0.0 | 0.1 | 0.1 | 0.0 | 0.0 | 0.0 | 0.2 |
| Naphthenes [v %] | | 0.0 | 0.0 | 1.1 | 6.2 | 1.8 | 1.5 | 0.5 | 0.1 | 0.0 | 11.1 |
| Total | | 0.0 | 0.2 | 16.7 | 53.3 | 16.0 | 9.1 | 2.9 | 1.1 | 0.6 | 100.0 |
| Paraffins [v %] | 1:3 (v:v) Paraffinic component | 0.0 | 0.1 | 15.3 | 37.6 | 20.6 | 11.4 | 3.6 | 1.5 | 0.9 | 90.9 |
| Olefins[v %] | 1:Renewable gasoline | 0.0 | 0.0 | 0.2 | 0.1 | 0.0 | 0.0 | 0.0 | 0.1 | 0.0 | 0.3 |
| Aromatics [v %] | component | 0.0 | 0.0 | 0.0 | 0.0 | 0.1 | 0.1 | 0.0 | 0.0 | 0.0 | 0.2 |
| Naphthenes [v %] | | 0.0 | 0.0 | 0.5 | 3.3 | 2.0 | 1.9 | 0.7 | 0.2 | 0.0 | 8.5 |
| Total | | 0.0 | 0.1 | 16.0 | 40.9 | 22.7 | 13.3 | 4.3 | 1.7 | 1.0 | 99.9 |

From this table it can be observed that the prevailing carbon numbers are C5 and C6. Heavier carbon numbers, such as C7-C9 present only from about 16 to 40 vol-% of the composition. All in all, the blends are highly saturated, containing mainly paraffins, around 10% naphthenes and less than 1 vol-% unsaturated functionalities. The amount of C6 paraffins is notably high in all blends. Such carbon numbers and functionality in intermediates gave blend octane numbers below 50 (Table 5) and did not provide the surprising effect on octane numbers seen for blends richer in unsaturated hydrocarbons.

TABLE 10

Hydrocarbon distribution as per carbon numbers of blends of "paraffinic component 2" with "renewable first gasoline component" in ratios 3:1, 1:1 and 1:3.

| Carbon number | | 3 | 4 | 5 | 6 | 7 | 8 | 9 | 10 | 11+ | Total |
|---|---|---|---|---|---|---|---|---|---|---|---|
| Paraffins [v %] | 3:1 (v:v) Paraffinic component | 0.0 | 0.2 | 25.5 | 40.1 | 8.9 | 3.8 | 1.2 | 0.5 | 0.3 | 80.6 |
| Olefins[v %] | 2:Renewable gasoline | 0.0 | 0.0 | 0.1 | 0.2 | 0.0 | 0.0 | 0.0 | 0.0 | 0.0 | 0.3 |
| Aromatics [v %] | component | 0.0 | 0.0 | 0.0 | 1.3 | 0.0 | 0.0 | 0.0 | 0.0 | 0.0 | 1.3 |
| Naphthenes [v %] | | 0.0 | 0.0 | 1.9 | 13.7 | 1.2 | 0.6 | 0.2 | 0.1 | 0.0 | 17.7 |
| Total | | 0.0 | 0.2 | 27.6 | 55.3 | 10.1 | 4.4 | 1.5 | 0.6 | 0.3 | 99.9 |
| Paraffins [v %] | 1:1 (v:v) Paraffinic component | 0.0 | 0.2 | 22.0 | 36.1 | 15.0 | 7.6 | 2.4 | 1.0 | 0.6 | 84.9 |
| Olefins[v %] | 2:Renewable gasoline | 0.0 | 0.0 | 0.1 | 0.2 | 0.0 | 0.0 | 0.0 | 0.0 | 0.0 | 0.3 |
| Aromatics [v %] | component | 0.0 | 0.0 | 0.0 | 0.8 | 0.0 | 0.0 | 0.0 | 0.0 | 0.0 | 0.9 |
| Naphthenes [v %] | | 0.0 | 0.0 | 1.3 | 9.3 | 1.6 | 1.1 | 0.5 | 0.0 | 0.0 | 13.7 |
| Total | | 0.0 | 0.2 | 23.5 | 46.4 | 16.6 | 8.7 | 2.9 | 1.1 | 0.6 | 99.8 |
| Paraffins [v %] | 1:3 (v:v) Paraffinic component | 0.0 | 0.1 | 18.6 | 32.1 | 21.0 | 11.3 | 3.6 | 1.5 | 0.9 | 89.1 |
| Olefins[v %] | 2:Renewable gasoline | 0.0 | 0.0 | 0.2 | 0.1 | 0.0 | 0.0 | 0.0 | 0.1 | 0.0 | 0.4 |
| Aromatics [v %] | component | 0.0 | 0.0 | 0.0 | 0.4 | 0.0 | 0.0 | 0.0 | 0.0 | 0.0 | 0.5 |
| Naphthenes [v %] | | 0.0 | 0.0 | 0.6 | 4.8 | 1.9 | 1.7 | 0.7 | 0.2 | 0.0 | 9.9 |
| Total | | 0.0 | 0.1 | 19.4 | 37.5 | 23.0 | 13.0 | 4.3 | 1.7 | 1.0 | 99.9 |

This table shows how C5 and C6 paraffins prevail here as well. In all blends they account for over 50 vol-% of the hydrocarbons. Especially the amount of C6 paraffins is again remarkably high in all blends. All blends contained about 10 vol-% naphthenes, the most common carbon number being C6 there as well. Such carbon numbers and functionality in intermediates gave for renewable first gasoline component blend octane numbers close to that of the neat component (Table 6) and failed to provide the surprising effect on octane numbers seen for blends richer in unsaturated hydrocarbons.

TABLE 11

Hydrocarbon distribution as per carbon numbers of an intermediate hydrocarbon composition of blends of a "renewable first gasoline component" with "olefinic component" as the second gasoline component in ratios 3:1, 1:1 and 1:3.

| Carbon number | | 3 | 4 | 5 | 6 | 7 | 8 | 9 | 10 | 11+ | Total |
|---|---|---|---|---|---|---|---|---|---|---|---|
| Paraffins [v %] | 3:1 (v:v) Olefinic component:Renewable gasoline component | 0.0 | 0.0 | 4.8 | 13.5 | 11.4 | 6.3 | 2.8 | 1.5 | 2.6 | 42.9 |
| Olefins [v %] | | 0.0 | 0.0 | 3.4 | 10.4 | 7.0 | 3.4 | 1.6 | 0.4 | 0.0 | 26.2 |
| Aromatics [v %] | | 0.0 | 0.0 | 0.0 | 0.7 | 3.4 | 6.4 | 7.8 | 3.4 | 0.2 | 22.0 |
| Naphthenes [v %] | | 0.0 | 0.0 | 0.1 | 1.7 | 3.0 | 2.3 | 1.2 | 0.5 | 0.0 | 8.8 |
| Total | | 0.0 | 0.0 | 8.3 | 26.3 | 24.9 | 18.5 | 13.3 | 5.8 | 2.9 | 99.9 |
| Paraffins [v %] | 1:1 (v:v) Olefinic component:Renewable gasoline component | 0.0 | 0.0 | 8.2 | 18.4 | 16.7 | 9.3 | 3.5 | 1.6 | 2.1 | 59.8 |
| Olefins [v %] | | 0.0 | 0.0 | 2.4 | 6.9 | 4.7 | 2.3 | 1.0 | 0.3 | 0.0 | 17.6 |
| Aromatics [v %] | | 0.0 | 0.0 | 0.0 | 0.5 | 2.3 | 4.3 | 5.2 | 2.3 | 0.2 | 14.7 |
| Naphthenes [v %] | | 0.0 | 0.0 | 0.1 | 1.2 | 2.8 | 2.3 | 1.1 | 0.4 | 0.0 | 7.9 |
| Total | | 0.0 | 0.0 | 10.6 | 27.1 | 26.4 | 18.1 | 10.8 | 4.6 | 2.3 | 99.9 |
| Paraffins [v %] | 1:3 (v:v) Olefinic component:Renewable gasoline component | 0.0 | 0.0 | 11.6 | 23.3 | 21.9 | 12.2 | 4.2 | 1.8 | 1.7 | 76.6 |
| Olefins [v %] | | 0.0 | 0.0 | 1.3 | 3.5 | 2.3 | 1.2 | 0.5 | 0.2 | 0.0 | 9.0 |
| Aromatics [v %] | | 0.0 | 0.0 | 0.0 | 0.3 | 1.2 | 2.2 | 2.6 | 1.1 | 0.1 | 7.4 |
| Naphthenes [v %] | | 0.0 | 0.0 | 0.0 | 0.8 | 2.5 | 2.3 | 1.0 | 0.3 | 0.0 | 6.9 |
| Total | | 0.0 | 0.0 | 12.9 | 27.8 | 27.9 | 17.8 | 8.3 | 3.4 | 1.8 | 99.9 |

The hydrocarbon distribution of different blends of "renewable first gasoline component" with "olefinic component" shows a tendency for heavier hydrocarbons dominating the distribution. Even though C6 is strongly represented, C7 is practically equally strong. The total amount of C3-C6 hydrocarbons is about 40 vol-% or less while the heavier, C7-C11+ prevail. Blends of "renewable first gasoline component" with "olefinic component" gave impressive blend octane numbers for the "renewable first gasoline component" as shown in table 8.

TABLE 12

Hydrocarbon distribution as per carbon numbers of an intermediate hydrocarbon composition blends of a "renewable first gasoline component" with "aromatic component" as the second gasoline component in ratios 3:1, 1:1 and 1:3.

| Carbon number | | 3 | 4 | 5 | 6 | 7 | 8 | 9 | 10 | 11+ | Total |
|---|---|---|---|---|---|---|---|---|---|---|---|
| Paraffins [v %] | 3:1 (v:v) Aromatic component:Renewable gasoline component | 0.0 | 0.0 | 3.9 | 7.5 | 14.6 | 6.3 | 1.6 | 0.6 | 0.5 | 35.2 |
| Olefins [v %] | | 0.0 | 0.0 | 0.3 | 0.7 | 0.8 | 0.4 | 0.2 | 0.0 | 0.0 | 2.4 |
| Aromatics [v %] | | 0.0 | 0.0 | 0.0 | 0.3 | 17.6 | 22.1 | 18.0 | 1.3 | 0.6 | 59.8 |
| Naphthenes [v %] | | 0.0 | 0.0 | 0.1 | 0.3 | 0.9 | 0.8 | 0.3 | 0.1 | 0.0 | 2.4 |
| Total | | 0.0 | 0.0 | 4.3 | 8.8 | 33.9 | 29.5 | 20.2 | 2.0 | 1.1 | 99.7 |
| Paraffins [v %] | 1:1 (v:v) Aromatic component:Renewable gasoline component | 0.0 | 0.0 | 7.6 | 14.4 | 18.8 | 9.3 | 2.7 | 1.0 | 0.8 | 54.6 |
| Olefins [v %] | | 0.0 | 0.0 | 0.3 | 0.5 | 0.5 | 0.3 | 0.2 | 0.1 | 0.0 | 1.8 |
| Aromatics [v %] | | 0.0 | 0.0 | 0.0 | 0.2 | 11.7 | 14.7 | 12.0 | 0.9 | 0.4 | 39.9 |
| Naphthenes [v %] | | 0.0 | 0.0 | 0.0 | 0.3 | 1.3 | 1.2 | 0.5 | 0.1 | 0.0 | 3.6 |
| Total | | 0.0 | 0.0 | 8.0 | 15.4 | 32.4 | 25.5 | 15.4 | 2.1 | 1.2 | 99.9 |
| Paraffins [v %] | 1:3 (v:v) Aromatic component:Renewable | 0.0 | 0.0 | 11.3 | 21.3 | 22.9 | 12.2 | 3.8 | 1.5 | 1.0 | 74.0 |

TABLE 12-continued

Hydrocarbon distribution as per carbon numbers of an intermediate
hydrocarbon composition blends of a "renewable first gasoline component" with
"aromatic component" as the second gasoline component in ratios 3:1, 1:1 and 1:3.

| Carbon number | | 3 | 4 | 5 | 6 | 7 | 8 | 9 | 10 | 11+ | Total |
|---|---|---|---|---|---|---|---|---|---|---|---|
| Olefins[v %] | gasoline component | 0.0 | 0.0 | 0.3 | 0.3 | 0.3 | 0.1 | 0.1 | 0.1 | 0.0 | 1.1 |
| Aromatics [v %] | | 0.0 | 0.0 | 0.0 | 0.1 | 5.9 | 7.4 | 6.0 | 0.4 | 0.2 | 20.0 |
| Naphthenes [v %] | | 0.0 | 0.0 | 0.0 | 0.3 | 1.8 | 1.7 | 0.7 | 0.2 | 0.0 | 4.8 |
| Total | | 0.0 | 0.0 | 11.6 | 22.0 | 30.9 | 21.4 | 10.6 | 2.1 | 1.2 | 99.9 |

Here the hydrocarbon distribution is clearly dominated by hydrocarbons C7-C11+. The C3-C6 hydrocarbons are mainly paraffins and provide only 13.1-33.6 vol-% of the total volume. Considering carbon numbers C7 and C8, aromatics provide a notable share of the hydrocarbons. As seen in table 7, these blends comprising unsaturated hydrocarbons provided the surprising effect on blend octane numbers for the renewable first gasoline component.

As to the carbon numbers and shares thereof, intermediate hydrocarbon compositions, wherein the total amount of C7-C11 hydrocarbons is at least 59%-vol, preferably at least 65 vol-%, most preferably at least 70%-vol of the total intermediate hydrocarbon composition volume, seem advantageous in providing good bROM and bMON values for the renewable first gasoline component.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An intermediate hydrocarbon composition, comprising:
a renewable first gasoline component in an amount of from 5 to 50%-vol of a total intermediate hydrocarbon composition volume, wherein the renewable first gasoline component includes alkanes selected from renewable C4-C9 n-alkanes, renewable C4-C11 iso-alkanes and renewable C4-C9 cyclo-alkanes, and a sum amount of said renewable C4-C9 n-alkanes, said renewable C4-C11 iso-alkanes and said renewable C4-C9 cyclo-alkanes is from 92 to 100%-vol of a total renewable first gasoline component volume;
and a remainder of the total intermediate hydrocarbon composition volume consisting of a second gasoline component, wherein said second gasoline component is a non-renewable gasoline component that includes unsaturated hydrocarbons from 50 to 90%-vol of a second gasoline component volume, and wherein said unsaturated hydrocarbons consist of a combination of C6-C12 aromatic hydrocarbons, and C4-C10 olefinic hydrocarbons, wherein a ratio by volume of C6-C12 aromatic hydrocarbons to C4-C10 olefinic hydrocarbons is from 0.01 to 1; and
wherein a renewable or petroleum origin of any hydrocarbons is determined by isotopic distribution involving 14C, 13C and/or 12C as described in ASTM D6866.

2. The intermediate hydrocarbon composition according to claim 1, wherein the renewable first gasoline component comprises:
alkanes selected from renewable C4-C9 n-alkanes, renewable C4-C11 iso-alkanes and renewable C4-C9 cyclo-alkanes, and a sum amount of said renewable C4-C9 n-alkanes, said renewable C4-C11 iso-alkanes and said renewable C4-C9 cyclo-alkanes is from 96 to 100%-vol of the total renewable first gasoline component volume.

3. The intermediate hydrocarbon composition according to claim 1, wherein the second gasoline component comprises unsaturated hydrocarbons from 60 to 90%-vol of a total second gasoline component volume.

4. The intermediate hydrocarbon composition according to claim 1, wherein a total amount of C7-C11 hydrocarbons is at least 59%-vol of a total intermediate hydrocarbon composition volume.

5. The intermediate hydrocarbon composition according to claim 1, wherein the second gasoline component is a petroleum derived component.

6. The intermediate hydrocarbon composition according to claim 1, wherein the renewable first gasoline component is a renewable source derived component.

7. The intermediate hydrocarbon composition according to claim 1, wherein a RON of said intermediate hydrocarbon composition as measured according to ASTM D2699, is from 70 to 95.

8. A second gasoline component comprising unsaturated hydrocarbons from 50 to 90%-vol of a second gasoline component volume, wherein said unsaturated hydrocarbons consist of C6-C12 aromatic hydrocarbons, C4-C10 olefinic hydrocarbons or a combination thereof, for increasing RON of a renewable first gasoline component including:
alkanes selected from renewable C4-C9 n-alkanes, renewable C4-C11 iso-alkanes and renewable C4-C9 cyclo-alkanes, and a sum amount of said renewable C4-C9 n-alkanes, said renewable C4-C11 iso-alkanes and said renewable C4-C9 cyclo-alkanes is from 92 to 100%-vol of a total renewable first gasoline component volume to provide an intermediate hydrocarbon composition;

wherein the second gasoline component is a non-renewable gasoline component; and wherein a renewable or petroleum origin of any hydrocarbons is determined by isotopic distribution involving 14C, 13C and/or 12C as described in ASTM D6866.

9. The second gasoline component according to claim 8, wherein the renewable first gasoline component comprises:

alkanes selected from renewable C4-C9 n-alkanes, renewable C4-C11 iso-alkanes and renewable C4-C9 cyclo-alkanes, and the sum amount of said renewable C4-C9 n-alkanes, said renewable C4-C11 iso-alkanes and said renewable C4-C9 cyclo-alkanes is from 96 to 100%-vol of the total renewable first gasoline component volume.

10. The second gasoline component according to claim 8, wherein the second gasoline component comprises:

unsaturated hydrocarbons from 65 to 85%-vol of the total second gasoline component volume.

11. The second gasoline component according to claim 8, wherein the unsaturated hydrocarbons consist of a combination of aromatic hydrocarbons and olefinic hydrocarbons, wherein a ratio by volume of C6-C12 aromatic hydrocarbons to C4-C10 olefinic hydrocarbons is from 0.01 to 1.

12. The second gasoline component according to claim 8, wherein a total amount of C7-C11 hydrocarbons is at least 59%-vol of the total intermediate hydrocarbon composition volume.

13. The second gasoline component according to claim 8, wherein the second gasoline component is a petroleum derived component.

14. The second gasoline component according to claim 8, wherein the renewable first gasoline component is a renewable source derived component.

15. The second gasoline component according to claim 8, wherein the RON of said intermediate hydrocarbon composition as measured according to ASTM D2699, is from 70 to 95.

16. The second gasoline component according to claim 8, wherein said intermediate hydrocarbon composition is blended with at least one further component selected from butane and at least one octane enhancer.

17. The second gasoline component according to claim 16, wherein said octane enhancer is selected from C1-C5 alcohols and ethers, and/or from ETBE, MTBE, TAME, TAEE, mixed ethers, ethanol, methanol, i- or n-propanol, i- or n-butanol, tertiary butanol, mixed C1 to C5 alcohols, and/or combinations thereof.

18. The second gasoline component according to claim 8 configured as a gasoline fuel.

19. The second gasoline component according to claim 18, wherein said gasoline fuel fulfils requirements set in Directive 2009/30/EC, and optionally in EN228: 2012 amended 2017.

20. The second gasoline component according to claim 18, wherein said gasoline fuel comprises:

the intermediate hydrocarbon composition in an amount of 60-98%-vol of total gasoline fuel volume.

21. The second gasoline component according to claim 18, wherein the RON of said gasoline fuel as measured according to ASTM D2699, is from 90 to 110.

* * * * *